United States Patent Office 3,316,089
Patented Apr. 25, 1967

3,316,089
PHOTOGRAPHIC PRODUCTS AND PROCESSES UTILIZING CROSS-LINKING AGENTS CONTAINING INTRALINEAR QUATERNARY NITROGEN ATOMS
Howard C. Haas, Arlington, and Lloyd D. Taylor, Everett, Mass., assignors to Polaroid Corporation, Cambridge, Mass., a corporation of Delaware
No Drawing. Filed July 3, 1963, Ser. No. 292,733
5 Claims. (Cl. 96—29)

The present invention relates to the modification of polymeric materials and, more particularly, to modification of the polymeric materials particularly adapted for employment in photographic products and to photographic processes employing such products.

One object of the present invention is to provide novel polymeric materials and photographic processes employing compounds particularly adapted to effect modification of polymeric materials.

A further object of the present invention is to provide novel photographic film units, comprising not less than one photosensitive silver halide emulsion, possessing one or more layers containing novel modified water-insoluble, water-permeable polymeric materials and photographic processes employing such film units.

A still further object of the present invention is to provide novel photographic elements, comprising not less than one photosensitive silver halide emulsion, wherein at least part of the polymeric colloid binder for the silver halide crystals comprises novel polymeric materials and photographic processes, both conventional and diffusion transfer, employing these elements.

A still further object of the present invention is to provide novel photographic elements, comprising not less than one silver halide emulsion having associated therewith not less than one contiguous layer containing color image-forming components, wherein at least one of said color forming component containing layers contains novel polymeric materials, and photographic color processes, both conventional and diffusion transfer, employing such elements.

A still further object of the present invention is to provide novel cross-linking agents adapted to effect cross-linking of polymeric materials containing free hydroxyl, mercapto and/or amino groups, wherein said cross-linking agents possess internal mordanting sites adapted to retain color image-forming components.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The aforementioned objects are accomplished, in accordance with the present invention, by reacting, at a pH of less than 7, a polymeric material containing free hydroxyl, amino and/or mercapto groups, which are capable of reacting with aldehydes, such as gelatin, polyvinyl alcohol, hydroxyethyl cellulose, hydroxyethyl polyvinyl alcohol, etc., with the reaction product of a multifunctional alkylating agent and a tertiary aminomonoaldehyde and employing the resultant polymeric material in accordance with the following illustrative disclosure. The reaction product of a multifunctional alkylating agent, e.g., a haloaldehyde, and a tertiary aminoaldehyde is a bifunctional compound containing at least one intralinear quaternary nitrogen atom, the functional groups being capable of reacting with the —OH, —NH$_2$ or —SH groups of a polymer.

The cross-linking agents may be represented by the formulae:

(I)
$$H-\overset{O}{\overset{\|}{C}}-X-\overset{O}{\overset{\|}{C}}-H$$

(II)
$$\begin{array}{c}HO\diagdown\quad\quad\quad\diagup OH\\ \quad CH-X-CH\\ HO\diagup\quad\quad\quad\diagdown OH\end{array}$$

(III)
$$\begin{array}{c}RO\diagdown\quad\quad\quad\diagup OR\\ \quad CH-X-CH\\ RO\diagup\quad\quad\quad\diagdown OR\end{array}$$

wherein X is a divalent organic radical containing carbon and hydrogen and at least one, and not more than two, intralinear quaternary nitrogen atoms, and each R is a lower alkyl group.

As examples of suitable tertiary aminoaldehydes mention may be made of 3-dimethylaminopivaldehyde, p-dimethylaminobenzaldehyde, 4-pyridine carboxaldehyde, 3-pyridine carboxaldehyde, 4-dimethylamino-cinnamaldehyde.

As examples of suitable multifunctional alkylating agents mention may be made of α,α'-dibromo-p-xylene, α,α'-dibromo-m-xylene, α,α'-dichloro-p-xylene, 1,3-dibromopropane, 3-bromopropyl-p-toluene-sulfonate, propylene glycol-1,3-bis-benzenesulfonate, 1,4-dibromobutane and 1,4-dibromobutene-2.

The particular anionic portion of the quaternary salt is not critical and therefore may be selected from the various anions.

As examples of cross-linking agents that are useful in this invention, mention may be made of the following:

(1)
$$\underset{H}{\overset{O}{\underset{\|}{\diagdown}}}C-\!\!\!\left\langle\underset{}{\phantom{X}}\right\rangle\!\!\!-\overset{\oplus}{N}-CH_2-\!\!\!\left\langle\underset{}{\phantom{X}}\right\rangle\!\!\!-CH_2-\overset{\oplus}{N}-\!\!\!\left\langle\underset{}{\phantom{X}}\right\rangle\!\!\!-\overset{O}{\underset{H}{\diagup}}C\quad 2Br^{\ominus}$$

(2)
$$\underset{H}{\overset{O}{\diagdown}}C-\underset{CH_3}{\overset{CH_3}{\underset{|}{C}}}-CH_2-\overset{CH_3}{\underset{|}{\overset{\oplus}{N}}}-CH_2-\!\!\!\left\langle\underset{}{\phantom{X}}\right\rangle\!\!\!-CH_2-\overset{CH_3}{\underset{CH_3}{\overset{\oplus}{N}}}-CH_2-\underset{CH_3}{\overset{CH_3}{\underset{|}{C}}}-\overset{O}{\underset{H}{\diagup}}C\quad 2Br^{\ominus}$$

(3)
$$\underset{H}{\overset{O}{\diagdown}}C-\!\!\!\left\langle\underset{}{\phantom{X}}\right\rangle\!\!\!-\overset{CH_3}{\underset{CH_3}{\overset{\oplus}{N}}}-CH_2-CH=CH-CH_2-\overset{CH_3}{\underset{CH_3}{\overset{\oplus}{N}}}-\!\!\!\left\langle\underset{}{\phantom{X}}\right\rangle\!\!\!-\overset{O}{\underset{H}{\diagup}}C\quad 2Br^{\ominus}$$

(4)
$$\underset{H}{\overset{O}{\diagdown}}C-CH=CH-\!\!\!\left\langle\underset{}{\phantom{X}}\right\rangle\!\!\!-\overset{CH_3}{\underset{CH_3}{\overset{\oplus}{N}}}-CH_2-CH_2-CH_2-\overset{CH_3}{\underset{CH_3}{\overset{\oplus}{N}}}-\!\!\!\left\langle\underset{}{\phantom{X}}\right\rangle\!\!\!-CH=CH-\overset{O}{\underset{H}{\diagup}}C\quad 2CH_3-\!\!\!\left\langle\underset{}{\phantom{X}}\right\rangle\!\!\!-SO_3^{\ominus}$$

(5)

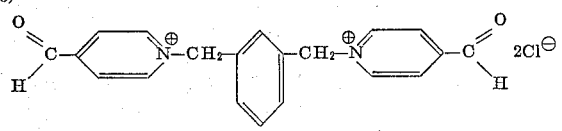

The novel cross-linking agents of this invention may also be prepared by reacting a haloaldehyde such as p-formylbenzylchloride (p-chloromethylbenzaldehyde) and a di-tertiary amine. As examples of diamines suitable for use in the preparation of compounds of this invention, mention may be made of bis-1,3-dimethylaminopropane, N,N,N',N' - tetramethyl - p-phenylenediamine, bis-1,4-dimethylaminobutane and 1,4-diazobicyclo-(2,2,2)-octane.

The novel cross-linking agents of this invention may also be prepared by reacting a tertiary aminoaldehyde with a haloaldehyde, e.g., 4-pyridine carboxaldehyde and p-formyl-benzyl chloride to give

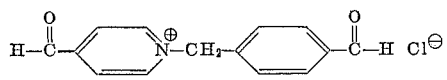

The term "dialdehyde," as used herein, should be understood to include derivatives of dialdehydes which are also useful in supplying the cross-linking function of the novel cross-linking agents of this invention. Such aldehyde derivatives include acetals, gem-diesters and gem-diols. The preparation of such derivatives is analogous to the preparation of the dialdehydes and known to the art. For example, diacetal cross-linking mordants within this invention may be prepared by reacting a di-tertiary amine with a haloacetal or by reacting a dihalide and a tertiary aminoacetal. In the preferred embodiment, however, the quaternary salt contains terminal aldehyde groups.

It should also be understood that some aldehydes are hydrated in aqueous solution and exist as mixtures of aldehydes and gem-diols or entirely as gem-diols. This is especially true when an electron withdrawing quaternary nitrogen atom is in close proximity to the aldehyde group. As stated above, the gem-diol form of the compound is also a cross-linking agent. As an example of a gem-diol cross-linking mordant, mention may be made of:

(6)

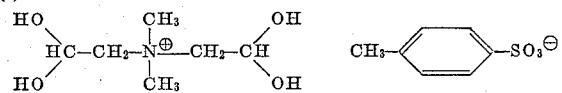

As examples of diacetal cross-linking agents within the scope of this invention, mention may be made of the following:

(7)

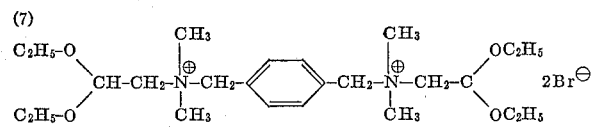

(8)

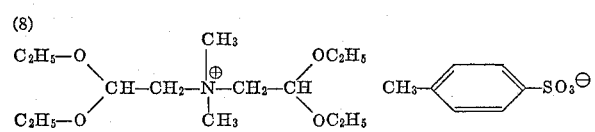

While the preferred cross-linking agents of this invention comprise a dialdehyde containing at least one quaternary nitrogen atom, it should be understood that the cross-linking agents of this invention may be any compound that contains functional groups, e.g., isocyanates, that can react with the —OH, —NH₂, or —SH groups of the polymer to thereby cross-link the polymer, and contains at least one functional group capable of mordanting dyes, e.g., an intralinear quaternary nitrogen atom.

The following nonlimiting examples illustrate the preparation of cross-linking agents suitable for use in this invention.

*Example 1*

A mixture of α,α'-dibromo-p-xylene and an excess of 3-dimethylaminopivaldehyde in dry benzene was heated to 80° C. on a steam bath for 2 hours. The resulting viscous green precipitate is separated and dissolved in absolute alcohol and reprecipitated in ether. The resulting white, hygroscopic salt, p - xylylene - bis-3-dimethylammonium-pivaldehyde dibromide melts at 67° C. and is soluble in water. Analysis of the monohydrate showed:

|  | C | H | Br |
|---|---|---|---|
| Calculated | 49.0 | 7.4 | 29.6 |
| Found | 49.2 | 7.7 | 29.9 |

*Example 2*

A mixture of α,α'-dibromo-p-xylene and an excess of 4-pyridinecarboxaldehyde was allowed to react in dry acetone. After 10 minutes the resulting yellow hygroscopic salt, p-xylylene-bis-4-formylpyridinium dibromide, was separated. The product melts at 90° C. and is soluble in water. Analysis of the monohydrate showed:

|  | C | H |
|---|---|---|
| Calculated | 46.6 | 4.3 |
| Found | 46.5 | 4.0 |

*Example 3*

To a solution of 5 grams of α,α'-dibromo-p-xylene in 75 cc. of dry acetone a large excess of dimethylaminoacetaldehydediacetal was added with stirring. The product was a white solid melting at 197° C. and of the formula:

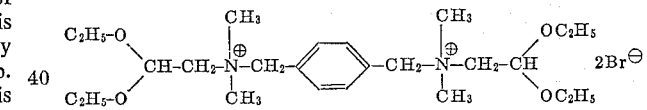

Analysis showed:

|  | C | H | N | Br |
|---|---|---|---|---|
| Calculated | 49.2 | 7.9 | 4.8 | 27.14 |
| Found | 49.4 | 7.9 | 5.0 | 27.1 |

*Example 4*

10 grams of bisacetalylmethylamine was mixed with an excess of methyl-p-toluenesulfonate in ether. A white crystalline salt precipitated and was separated on a filter and washed with ether. The product,

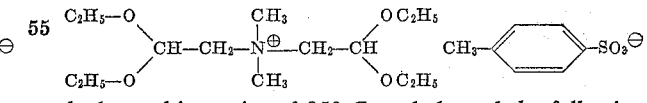

had a melting point of 85° C. and showed the following analysis:

|  | C | H |
|---|---|---|
| Calculated | 56.2 | 8.7 |
| Found | 56.1 | 8.6 |

The novel cross-linking agents suitable for use in the present invention are disclosed and claimed in the copending application of Howard C. Haas and Lloyd D. Taylor, Serial No. 128,699, filed August 2, 1961, now abandoned, the subject matter of which has been disclosed in continuation-in-part application Serial No. 475,261, filed July 27, 1965.

The amount of cross-linking agent employed is not critical, as any amount added under the conditions described will result in hardening or cross linking of the polymeric material. However, it is desired that the amount of cross-linking agent added be sufficient to assure the substantial cross linking or hardening of the polymer with which it is employed. For instance, a convenient amount of cross-linking agent may be in the order of about 0.001 to 0.1 mole per 100 grams, when the polymeric material is gelatin, in order to expeditiously apply an aqueous coating solution containing hardened gelatin polymer. Since the cross-linking agents are also mordants, the amount used should be low enough to prevent any substantial entrapment of dye on the polymer layer.

The cross-linking agents of the present invention may be employed in the form of an aqueous solution. When desired, however, the cross-linking agents may also be dissolved in appropriate organic solvents such as ethanol, etc. especially when employment in nonaqueous coating systems is desired.

The following nonlimiting examples illustrate the use of the cross-linking agents within the scope of this invention.

*Example 5*

0.1 cc. (0.0013 mole per 100 gm. of gelatin), 0.2 cc. (0.0026 mole per 100 gm. of gelatin), 1.0 cc. (0.013 mole per 100 gm. of gelatin), and 5.0 cc. (0.065 mole per 100 gm. of gelatin) aliquots, respectively, of a solution containing 0.5 gm. of the product of Example 1 and 10 cc. of water were mixed for 5 minutes at 38° C. with aliquots comprising 11.5 gm. of a silver iodobromide emulsion containing 2.5 gm. of gelatin, 1.5 cc. of saponin, 1.0 cc. of 5% glacial acetic acid, and 14 cc., 13 cc., 9 cc., and 4 cc., respectively, of water.

The resultant individual mixtures were coated on a cellulose acetate film base, dried, and subjected to frill tests to determine the resistance of the coatings, i.e., time required for separation or dissolution from the base upon immersion in distilled water at 50° C. and also upon immersion in an aqueous 5% sodium hydroxide solution at 20° C., using sample strips 1 inch wide by 5 inches long.

The frill test results which indicate hardening of the gelatin film are set forth in the table below:

| Hardener (moles/ 100 gm. of gel) | Frill Time (Seconds) | |
| --- | --- | --- |
| | Water (50° C.) | 5% Sodium Hydroxide (20° C.) |
| 0.001 | 2.6 | 7.3 |
| 0.002 | 3.0 | 7.6 |
| 0.01 | 6.3 | 17.4 |
| 0.05 | 11.4 | 18.6 |

As illustrated above, the cross-linking agent may be advantageously incorporated in the polymeric intermediate as a "coating final" just prior to coating the composition on a suitable supporting member.

Unexpectedly, it has been specifically found that photographic film units employed to effectuate diffusion transfer processes, as well as the transfer processes themselves, may be substantially improved by incorporating a polymeric material cross linked or hardened, in accordance with the present invention, in the film unit.

It will be recognized that although the beneficial results of the instant invention are, in particular, detailed herein in terms of the preferred diffusion transfer photographic processes and products particularly adapted for use therein, the concepts of the invention are also applicable to conventional photographic products and systems.

In diffusion transfer processes, for the formation of positive silver images, an exposed photosensitive silver halide emulsion is developed and almost concurrently therewith a soluble silver complex is obtained by reaction of a silver halide solvent with the unexposed and undeveloped silver halide of said emulsion. Preferably, the photosensitive silver halide emulsion is developed with a processing composition in a viscous condition which is spread between the photosensitive element comprising the silver halide emulsion and a print-receiving element comprising a suitable silver precipitating layer. The processing composition effects development of the exposed emulsion and substantially contemporaneous therewith forms a soluble silver complex, for example, a thiosulfate or thiocyanate, with undeveloped silver halide. This soluble silver complex is, at least in part, transported in the direction of the print-receiving element and the silver thereof is largely precipitated in the silver precipitating layer of said element to form a positive image therein.

Additive color reproduction may be produced by exposing a photosensitive silver halide emulsion through an additive color screen having filter media or screen elements each of an individual additive color, such as red or blue or green, and by viewing the reversed or positive silver image, formed by the aforementioned transfer to a transparent print-receiving element, through the same or a similar screen which is suitably registered with the reversed positive image carried by the print-receiving layer.

U. S. Patents Nos. 2,647,049, issued July 28, 1953; 2,661,293, issued December 1, 1953; 2,698,244, issued December 28, 1954; 2,698,798, issued January 4, 1955; and 2,802,735, issued August 13, 1957, disclose subtractive color diffusion transfer processes wherein color coupling techniques are utilized which comprise, at least in part, reacting one or more developing agents and one or more color formers to provide a positive color image on a superposed image-receiving layer. U. S. Patent No. 3,019,124, issued January 30, 1962, discloses the manufacture of photographic color screen elements; and U. S. Patents Nos. 2,968,554, issued January 17, 1961 and 2,983,606, issued May 9, 1961 disclose diffusion transfer processes wherein a color screen element is utilized to provide a multicolor positive image to a superposed image-receiving layer. U. S. Patent No. 2,774,668, issued December 18, 1956, the copending U. S. application of Edwin H. Land and Howard G. Rogers, Serial No. 565,135, filed February 13, 1956 and the previously cited U. S. Patent No. 2,983,606 disclose diffusion transfer processes wherein complete dyes are utilized to provide a positive color image to a superposed image-receiving layer.

In processes of the type set forth in U. S. Patent No. 2,983,606, a photosensitive element containing a dye developer and a silver halide emulsion is exposed and wetted by a liquid processing composition, for example, by immersion, coating, spraying, flowing, etc., in the dark, and the exposed photosensitive element is superposed prior to, during, or after wetting, on a sheetlike support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition permeates the emulsion to initiate development. The dye developer is immobilized or precipitated in developed areas as a consequence of the development. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In undeveloped and partially developed areas of the emulsion, the dye developer is unreacted and diffusible and thus provides an imagewise distribution of unoxidized dye developer dissolved in the liquid processing composition, as a function of the point-to-point degree of development of the silver halide emulsion. At least part of this imagewise distribution of unoxidized dye developer is transferred, by imbibition, to a superposed image-receiving layer or element, to provide the transfer image. Under certain conditions, the layer of liquid processing composition may be utilized as the image-receiving layer. The image-receiving element receives a depthwise diffusion, from the developed emulsion, of unoxidized dye developer without appreciably disturbing the imagewise distribution thereof to provide the transfer image. The image-receiving element may contain agents adapted to mordant or otherwise fix the diffused, unoxidized dye developer. If the color of the transferred dye developer is affected by changes in the pH of the image-receiving element, this pH may be adjusted in accordance with well-known techniques to provide a pH affording the desired color. The desired transfer image is revealed by stripping the image-receiving layer from the photosensitive element at the end of a suitable imbibition period.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using color image-forming components such as, for example, the previously mentioned dye developers, in diffusion transfer processes by several techniques. One such technique contemplates the use of a photosensitive silver halide stratum comprising at least two sets of selectively sensitized minute photosensitive elements arranged in the form of a photosensitive screen. Transfer processes of this type are disclosed in the previously noted U. S. Patents Nos. 2,968,554 and 2,983,606. In such an embodiment, each of the minute photosensitive elements has associated therewith an appropriate dye developer in or behind the silver halide emulsion portion. In general, a suitable photosensitive screen, prepared in accordance with the disclosures of said patents, comprises minute red-sensitized emulsion elements, minute green-sensitized emulsion elements and minute blue-sensitized emulsion elements arranged in side-by-side relationship in a screen pattern and having associated therewith, respectively, a cyan dye developer, a magenta dye developer and a yellow dye developer.

Another process for obtaining multicolor transfer images utilizing dye developers employs an integral multilayer photosensitive element, such as is disclosed in the aforementioned copending U.S. application Serial No. 565,135, wherein at least two selectively sensitized photosensitive strata are superposed on a single support and are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata may be separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

The present invention will be illustrated in greater detail in conjunction with the following additional specific examples which set out representative photographic products and processes which, however, are also intended to be illustrative and not of limiting effect.

*Example 6*

In accordance with the previous explanation, a monochromatic photosensitive element was prepared by coating a gelatin-coated film base with sufficient 2-(p-[2',5'-dihydroxyphenethyl] - phenylazo) - 4 - isopropoxy - 1 - naphthol, dispersed in a 4% gelatin solution containing 3 cc. of a solution containing 0.1 gram of the cross-linking agent of Example 1 and 9 cc. of water per 50 cc. of gelatin solution, to give a coverage of about 70 mgs. of dye per square foot. The last-mentioned dye developer is disclosed in the copending U.S. application of Blout et al., Serial No. 145,978, filed October 18, 1961, now U.S. Patent 3,134,764. After this coating had dried, a gelatino silver iodobromide emulsion, comprising 1.5 cc. of a solution containing 0.1 gram of the cross-linking agent of Example 1 and 9 cc. of water per 30 cc. of emulsion containing 2.5 grams of gelatin, was applied to provide about 100 mgs. of silver per square foot. The photosensitive element was then exposed and diffusion transfer processed by spreading an aqueous liquid processing composition comprising:

| | |
|---|---|
| Water _____cc__ | 100.0 |
| Sodium hydroxide _____gm__ | 5.0 |
| Hydroxyethyl cellulose _____gm__ | 4.03 |
| Benzotriazole _____gm__ | 2.3 |
| Sodium thiosulfate _____gm__ | 1.15 |
| N-benzyl-α-picolinium bromide _____gm__ | 2.3 | between said photosensitive element and an image-receiving element comprising a sheet of cellulose acetate subcoated baryta paper having coated thereon a mixture of polyvinyl alcohol and poly-4-vinypyridine, as said elements were brought into superposed relationship. After an imbibition period of one minute, the image-receiving element was separated and revealed a monochromatic magenta dye image of the photosensitive element's exposure response.

Multicolor diffusion transfer processes were then conducted employing the image-receiving element and processing composition set forth in the preceding example and multilayer photosensitive elements prepared in a manner similar to that disclosed in the aforementioned copending U.S. application Serial No. 565,135 and detailed hereinbefore. In general, the photosensitive elements comprised a support carrying a red-sensitive silver halide emulsion stratum, a green-sensitive silver halide emulsion stratum and a blue-sensitive silver halide emulsion stratum. The colloid binder of each emulsion stratum comprised 1.5 cc. of a solution containing 0.1 gram of the cross-linking agent of Example 1 and 9 cc. of water per 30 cc. of emulsion containing 2.5 grams of gelatin. In turn, the emulsions had dispersed behind them in water-immiscible organic solvents and contained in separate gelatin polymeric layers, coated from a mixture comprising 3 cc. of a solution containing 0.1 gram of the cross-linking agent of Example 1 and 9 cc. of water per 50 cc. of 4% gelatin coating solution, respectively, a cyan developer, a magenta dye developer and a yellow dye developer. The particular dye developers employed in the photosensitive elements were 1,4-bis-(α-methyl-β-hydroquinonylethylamino) - 5,8 - dihydroxyanthraquinone (a cyan dye developer); 2-(p-[2',5'-dihydroxyphenethyl] - phenylazo) - 4 - isopropoxy - 1-naphthol (a magenta dye developer); and 1-phenyl-3-n-hexyl-carbamyl - 4 - (p - [hydroquinonylethyl]-phenylazo)-5-pyrazolone (a yellow dye developer). The last-mentioned yellow and cyan dye developers are disclosed in the copending U.S. application of Elkan R. Blous et al., Serial No. 145,978 now U.S. Patent 3,134,764, filed October 18, 1961 and the copending U.S. application of Blout et al., Serial No. 233,461, now U.S. Patent 3,135,606, filed October 26, 1962, respectively.

*Example 7*

A silver diffusion transfer process was conducted by coating a gelatin-coated film base with a gelatino silver iodobromide emulsion comprising 1.5 cc. of a solution containing 0.1 gram of the cross-linking agent of Example 1 and 9 cc. of water per 30 cc. of emulsion containing 2.5 grams of gelatin, to provide 230 to 250 mgs. of silver per square foot. The photosensitive element was then exposed and processed by rupturing an aqueous liquid processing composition retaining pod between the photosensitive element and an image-receiving element as the respective elements were brought into superposed relationship. (Both the image-receiving element and processing composition retaining pod employed were those commercially available from Polaroid Corporation, Cambridge, Massachusetts under the trade designation of Type 42.) After an imbibition period of approximately 10 seconds, the image-receiving element was separated and revealed a reversed, positive silver transfer of the exposure pattern.

*Example 8*

A conventional photographic process was conducted by exposing a photosensitive element prepared in the manner set forth in Example 7 and then developing the element at 68° F., for 5 minutes with commercial Dektol processing composition (available from Eastman Kodak Co., Rochester, New York).

A further technique for obtaining multicolor images employs a plurality of photosensitive elements associated with an appropriate number of image-receiving elements and adapted to be treated with one or more liquid processing compositions, the appropriate dye developers, for example, being incorporated in the photosensitized elements. Examples of film processes of this type are disclosed in U.S. Patent No. 2,647,049, issued July 28, 1953.

The preceding color image-forming components, for example, dye developers, are preferably selected for their ability to provide colors that are useful in carrying out substractive color photography, i.e., cyan, magenta and yellow. It should be noted that it is within the scope of this invention to use mixtures of dye developers, for example, to obtain a desired color, e.g., black. Thus it is to be understood that the expression "color" as used herein is intended to include the use of a plurality of colors to obtain black, as well as the use of a single black dye developer.

The dye developers employed in the processes of this invention may be incorporated in the photosensitive elements in, on, or behind the respective silver halide emulsion. As illustrated, the dye developer may, for example, be in a coating or layer behind the silver halide emulsion and such a layer of dye developer may be applied by the use of a coating solution containing about 0.5 to 8% by weight, of the respective dye developer.

The liquid processing composition referred to for effecting monochromatic and multicolor transfer processes comprises at least an aqueous solution of an alkaline compound, for example, diethylamine, sodium hydroxide or sodium carbonate and preferably possesses a pH in excess of 12. If the liquid processing composition is to be applied to the emulsion by being spread thereon, preferably in a relatively thin uniform layer, it includes a viscosity-increasing compound constituting a film-forming material of the type which, when said composition is spread and dried, forms a relatively firm and relatively stable film. A preferred film-forming material is a high molecular weight polymer such as a polymeric, water-soluble ether which is inert to an alkaline solution such as, for example, a hydroxyethyl cellulose or sodium carboxymethyl cellulose. Other film-forming materials or thickening agents whose ability to increase viscosity is substantially unaffected if left in solution for a long period of time may also be used. The film-forming material is preferably contained in the processing composition in suitable quantities to impart to said composition a viscosity in excess of 1000 centipoises at a temperature of approximately 24° C. and preferably of the order of 1000 to 200,000 centipoises at said temperature. Illustrations of suitable liquid processing compositions may be found in the several patents and copending applications herein mentioned and also in examples herein given. Under certain circumstances, it may be desirable to apply a liquid processing composition to the photosensitive element prior to exposure, in accordance with the technique described in U.S. Patent No. 3,087,816 issued April 30, 1963 to Edwin H. Land.

It will be noted that the liquid processing composition employed may contain an auxiliary or accelerating developing agent, such as p-methylaminophenol, 2,4-diaminophenol, p-benzylaminophenol, hydroquinone, toluhydroquinone, phenylhydroquinone, 4'-methylphenylhydroquinone, etc. It is also contemplated to employ a plurality of auxiliary or accelerating developing agents, such as a 3-pyrazolidone developing agent and a benzenoid developing agent, as disclosed in U.S. Patent No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bi-ethylenimino-hydroquinone. Such auxiliary developing agents may be employed in the liquid processing composition or they may be initially incorporated, at least in part, in the silver halide emulsion strata or the strata containing the dye developers. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed silver halide.

In addition, development may be effected in the presence of an onium compound, particularly a quarternary ammonium compound, in accordance with the processes disclosed in the copending U.S. application of Milton Green and Howard G. Rogers, Serial No. 50,851, filed August 22, 1960, now U.S. Patent 3,173,786.

U.S. Patent No. 2,707,150 issued April 26, 1955, discloses additive multicolor processes utilizing a color screen element in a photosensitive emulsion wherein, subsequent to the selective exposure of the photosensitive emulsion through said color screen and substantially simultaneous with the development of the latent image contained therein, the color screen element filter media, preferably soluble dyes, transfer, at least in part, by imbibition, to an image-receiving element to form therein a substantially duplicate screen pattern of the original color screen.

In products employed in the diffusion transfer processes of this invention, it is preferable to expose from the emulsion side. It is, therefore, desirable to hold the photosensitive element and the image-receiving element together at one end thereof by suitable fastening means in such manner that the photosensitive element and the image-receiving element may be spread apart from their superposed processing position during exposure. A camera apparatus suitable for processing roll film of the type just mentioned is provided by the Polaroid Land Camera, sold by Polaroid Corporation, Cambridge, Massachusetts, or similar camera structure such, for example, as the camera forming the subject matter of U.S. Patent No. 2,435,717. Camera apparatus of this type permits successive exposure of individual frames of the photosensitive element from the emulsion side thereof as well as individual processing of an exposed frame by bringing said exposed frame into superposed relation with a predetermined portion of the image-receiving element while drawing these portions of the film assembly between a pair of pressure rollers which require a container associated therewith and effect the spreading of the processing liquid released by rupture of said container, between and in contact with the exposed photosensitive frame and the predetermined, registered area of the image-receiving element.

As previously noted, the print-receiving stratums for employment in silver diffusion transfer processes preferably contain silver precipitating agents or nuclei, whose presence during the transfer process has a desirable effect on the amount and character of the silver precipitated during positive print formation. Examples of such silver precipitating agents are the metallic sulfides and selenides, thiooxalates, and thioacetamides, and colloidal metals disclosed in U.S. Patent No. 2,698,237. It is also desirable, as disclosed in that patent, to provide, as the vehicle for the silver precipitating agents, a macroscopically continuous film that consists of submacroscopic agglomerates of minute particles of a suitable water-insoluble, inorganic, preferably siliceous, material such as silica aerogel. The use of such a vehicle for the precipitating agents tends to aggregate the silver that is precipitated into its most effective condition for print formation.

Silver halide solvents suitable for incorporation in the processing composition includes conventional fixing agents such as sodum thiosulfate, sodium thiocyanate, ammonium thiosulfate, or associations of cyclic imides and nitrogenous bases such as associations of barbiturates or uracils and ammonia or amines. Of these, the conventional fixing agents specified are preferred.

It will be apparent that the relative proportions of the reagents of the diffusion transfer processing composition set forth may be altered to suit the requirements of the operator. Thus, it is within the scope of this invention to modify the herein described developing compositions by the substitution of preservatives, alkalies, silver halide solvents; etc., other than those specifically mentioned, provided that the pH of the composition is initially in excess of at least 10, for most favorable results, and most preferably in excess of 12. When desirable, it is also contemplated to include, in the developing composition, components such as restrainers, accelerators, etc. Similarly, the concentration of developing agent may be varied over a wide range and when desirable the developing agent may be disposed in the photosensitive element, prior to the exposure of the emulsion, in a separate permeable layer of the photosensitive element and/or in the photosensitive emulsion.

The support layers referred to may comprise any of the various types of conventional rigid or flexible supports, for example, glass, paper, metal, and polymeric films of both synthetic types and those derived from naturally occurring products. Suitable materials include paper; aluminums; polymethacrylic acid, methyl and ethyl esters; vinyl chloride polymers; polyvinyl acetal; polyamides such as nylon; polyesters such as polymeric films derived from ethylene glycolterephthalic acid; and cellulose derivatives such as cellulose acetate, triacetate, nitrate, propionate, butyrate, acetate-propionate, or acetate-butyrate.

It will be understood that silver halides of varying halide concentrations may be advantageously employed and that the silver halide emulsions employed may be chemically sensitized by any of the accepted procedures. For example, the emulsions may be chemically sensitized with sulfur compounds such as sodium thiosulfate or thiourea; with reducing substances such as stannous chloride; with salts of noble metals such as gold, rhodium and platinum; with amines and polyamines; with quaternary ammonium compounds such as $\alpha$-picolinium bromide, etc., and with polyethylene glycols and derivatives of same.

The emulsions may also be optically sensitized with cyanine and merocyanine dyes and where desired, suitable antifoggants, restrainers, accelerators, preservatives, and/or coating aids may be included in the composition of the emulsion.

The nature and construction of rupturable containers is well understood in the art; see, for example, U.S. Patent No. 2,543,181, issued February 27, 1951, and U.S. Patent No. 2,634,886, issued April 14, 1953.

The image-receiving element, for use in monochromatic and multichromatic subtractive color processes, comprises an image-receiving layer of opaque or transparent material which is liquid permeable and dyeable from alkaline solutions and which for purposes of simplicity may comprise a single sheet of permeable material, for example, paper. This element, however, may comprise a support upon which at least one liquid-permeable and dyeable layer is mounted. The support layer may have a water-impermeable subcoat over which the stratum of permeable and dyeable material is applied. In certain instances, the dyeable layer may comprise a layer of liquid processing composition which is adapted to remain adhered to the support layer upon stripping.

It will be apparent that, by appropriate selection of the image-receiving element from among suitable known opaque and transparent materials, it is possible to obtain either a colored positive reflection print or a colored positive transparency.

As examples of additional image-receiving materials, for use in the last-mentioned transfer processes, mention may be made of nylon such as N-methoxymethyl polyhexamethylene adipamide; partially hydrolyzed polyvinyl acetate; polyvinyl alcohol with or without plasticizers; baryta paper, i.e., a support having a baryta coating thereon; cellulose acetate with filler as, for example, one-half cellulose acetate and one-half oleic acid; gelatin; the polymeric materials of the instant invention; and other materials of a similar nature. Preferred materials comprise polyvinyl alcohol or gelatin containing a dye mordant such as poly-4-vinylpyridine, as disclosed in the copending U.S. application of Howard C. Haas, Serial No. 50,848, filed August 22, 1960, now U.S. Patent No. 3,148,061.

While a rupturable container provides a convenient means for spreading a liquid processing composition between layers of a film unit whereby to permit the processing to be carried out within a camera apparatus, the practices of this invention may be otherwise effected. For example, a photosensitive element, after exposure in suitable apparatus and while preventing further exposure thereafter to actinic light, may be removed from such apparatus and permeated with the liquid processing composition, as by coating the composition on said photosensitive element or otherwise wetting said element with the composition, following which the permeated, exposed photosensitive element, still without additional exposure to actinic light, is brought into contact with the image-receiving element for image formation in the manner heretofore described.

It is also to be understood that the invention may be successfully practiced without the use of a film-forming material in the liquid processing composition. As an illustration, a nonviscous liquid processing composition is particularly applicable with the processing technique last mentioned above and may be applied to the exposed photosensitive element by imbibition or coating practices and may be similarly applied to the image-receiving element before said elements are brought into superposed relation or contact for carrying out the transfer of nonimmobilized image-providing substances.

In all examples of this specification, percentages of components are given by weight unless otherwise indicated.

Throughout the specification and appended claims, the expression "positive image" has been used. This expression should not be interpreted in a restrictive sense since it is used primarily for purposes of illustration, in that it defines the image produced on the image-carrying layer as being reversed, in the positive-negative sense, with respect to the image in the photosensitive element. As an example of an alternative meaning for "positive image," assume that the photosensitive element is exposed to actinic light through a negative transparency. In this case, the latent image in the photosensitive element will be a positive and the image produced on the image-carrying layer will be a negative. The expression "positive image" is intended to cover such an image produced on the image-carrying layer.

Throughout the specification and claims, the expression "superposing" has been used. This expression is intended to cover the arrangement of two layers in overlying relation to each other either in face-to-face contact or in separated condition and including between them at least one layer or stratum of a material which may be a viscous liquid.

Since certain changes may be made in the above product and process without departing from the scope of the invention herein involved, it is intended that all matter contained in the above description shall be interpreted as illustrative and not in a limiting sense.

What is claimed is:

1. A photographic product which comprises a plurality of layers including a support, a silver halide emulsion located in a layer on said support, a polymer which comprises the reaction product of (a) a polymer containing groups selected from the group consisting of free hydroxyl, mercapto and amino groups with (b) a compound selected from the group consisting of

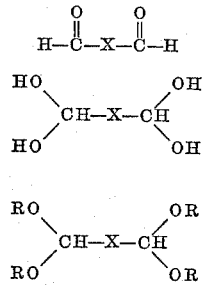

and wherein X is a divalent organic radical containing carbon and hydrogen and at least one intralinear quaternary nitrogen atom and each R is a lower alkyl radical; located in a layer on the same side of said support.

2. A photographic product as defined in claim 1, wherein said silver halide emulsion has associated therewith, in a layer on the same side of said support, a dye which is a silver halide developing agent, and said compound is employed in a concentration insufficient to effect substantial mordanting of said dye.

3. A photographic product as defined in claim 1, wherein said compound is p-xylene-bis-3-dimethylammonium-pivaldehyde dibromide.

4. In a diffusion transfer process which comprises the steps of developing an exposed photosensitive element comprising a plurality of layers including a silver halide emulsion layer, with a diffusion transfer processing composition, forming thereby an imagewise distribution of image-forming components in said photosensitive element, as a function of the point-to-point degree of exposure thereof, and transferring, at least part of said imagewise distribution, by diffusion, to a contiguous image-receiving layer to provide thereto a transfer image, the improvement which comprises at least one of said plurality of layers including a polymer which comprises the reaction product of (a) a polymer containing groups selected from the group consisting of free hydroxyl, mercapto and amino groups with (b) a compound selected from the group consisting of

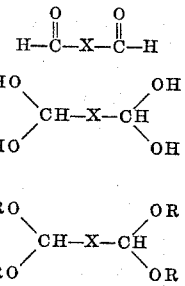

and wherein X is a divalent organic radical containing carbon and hydrogen and at least one intralinear quaternary nitrogen atom and each R is a lower alkyl radical.

5. In a process of forming diffusion transfer images in color which comprises the steps of developing an exposed photosensitive element comprising a plurality of layers including a silver halide emulsion layer, at least one of said layers containing a dye, which dye is a silver halide developing agent, by contacting said element with an aqueous alkaline solution, immobilizing said dye in exposed areas of said element, as a result of development, forming thereby an imagewise distribution of mobile dye, as a function of the point-to-point degree of exposure of said element, and transferring, by imbibition, at least a portion of said imagewise distribution of mobile dye to a superposed image-receiving layer to provide thereto a positive dye image, the improvement which comprises at least one of said plurality of layers including the reaction product of (a) a polymer selected from the group consisting of polyvinyl alcohol and gelatin with (b) a compound selected from the group consisting of

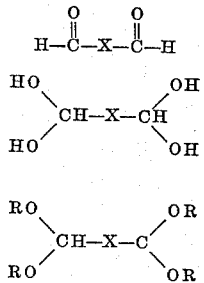

and wherein X is a divalent organic radical containing carbon and hydrogen and at least one intralinear quaternary nitrogen atom and each R is a lower alkyl radical; in a concentration insufficient to effect substantial mordanting of said dye.

References Cited by the Examiner

UNITED STATES PATENTS 3,091,537 5/1963 Burness _____ 96—111
3,121,607 2/1964 Ohno et al. _____ 8—115.5
3,239,337 3/1966 Haas _____ 96—3

NORMAN G. TORCHIN, *Primary Examiner.*

J. TRAVIS BROWN, *Examiner.*